Figure 1:
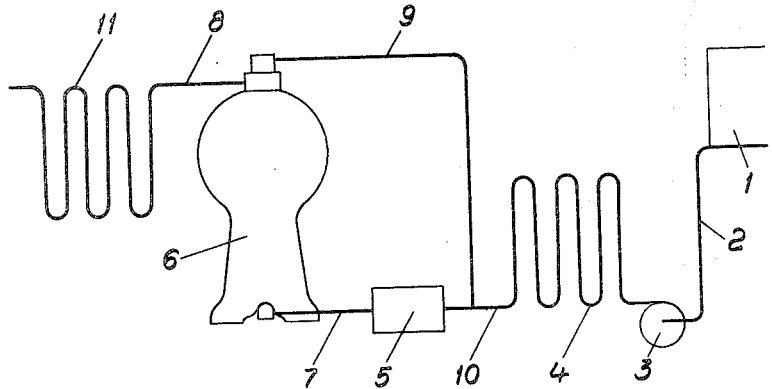

Jan. 23, 1951     O. E. FRÖDING     2,539,125
METHOD AND INSTALLATION FOR
HOMOGENIZATION OF LIQUIDS
Filed Aug. 4, 1948

Inventor:
Olof Einar Fröding
By Davis, Hopper & Faithfull
Attorneys

Patented Jan. 23, 1951

2,539,125

UNITED STATES PATENT OFFICE 2,539,125

METHOD AND INSTALLATION FOR HOMOGENIZATION OF LIQUIDS

Olof Einar Fröding, Stockholm, Sweden, assignor to Aktiebolaget Separator, Stockholm, Sweden, a corporation of Sweden Application August 4, 1948, Serial No. 42,518
In Sweden August 11, 1947

12 Claims. (Cl. 99—54)

The present invention relates to homogenization of liquids, such as milk and other emulsions or dispersions.

Milk consists of an emulsion of butter fat in milk serum. Butter fat is present in the form of small globules of various sizes. When milk is stored, the larger globules and the agglomerates of small globules rise to the surface and form a cream layer. When the milk is to be used for immediate consumption, so-called consumption milk, this results in certain inconveniences. If the milk is kept in a bottle and allowed to stand for some time, a cream stopper is formed in the mouth, and this gives the milk a less palatable appearance. Frequently, this stopper is removed without being consumed, although it contains an essential part of the nutrition value of the milk. This formation of a cream layer can, however, be prevented by homogenizing the milk, which means splitting up the larger fat globules so that the milk will contain only small fat globules. In order to be certain of the homogeneous state, the milk should, in addition, be heat-treated in a certain manner. Milk treated in such a way does not form any cream stoppers in the bottle neck, and, moreover, the milk is given a richer taste and becomes more readily digestible.

In addition, the large fat globules entail the inconvenience that it is difficult to purify the milk efficiently. That is, the fat globules frequently contain sludge particles which, by the buoyancy of the fat globules, are held afloat in the milk, and they as well as the globules remain in the milk during the centrifugal purification. This explains why, in a renewed centrifugal purification of milk which previously has been purified and then homogenized, a sedimentation of sludge can occur.

The dividing of the larger fat globules in the milk is done in a so-called homogenizing machine. Such machines may be of different designs, but all have one thing in common in that they are provided with stationary or relatively rotating surfaces which are generally arranged at a very small distance from each other. The liquid to be homogenized is forced between these surfaces. On account of the large velocity gradient in the flowing liquid, caused by the velocity of the surfaces relative to each other, or by a high pressure of the incoming liquid, the large fat globules are divided up into a number of smaller globules. This process requires a considerable amount of work per unit of liquid, partly because the work which is consumed by the inner friction of the flowing liquid is relatively great, and partly because the flowing liquid is given a considerable kinetic energy which, to a large extent, cannot be recovered. Consequently, the homogenization of milk requires a considerable power consumption, and it is of great importance to be able to reduce this.

The invention has for its object the homogenization of milk or similar liquids by combining a centrifugal separator and a homogenizing machine in such a way that efficient purification and homogenization are obtained at a comparatively small power consumption.

The invention is characterized by feeding the milk or the cream from a homogenizing machine to a centrifugal separator where, at the same time that it is purified, it is divided into two components, of which one consists of homogenized milk with small fat globules while the other contains larger fat globules, the latter component being then returned to the homogenizing machine. Since the centrifugal separation of the liquid is carried out subsequent to the homogenization, the latter treatment need not be as efficient as would otherwise be necessary. This is so because the centrifuge separates out the larger fat particles which have passed through the homogenizing machine without being divided up finely enough, and these larger particles are returned to the homogenizing machine for renewed treatment there until the size of the particles has been reduced to the required degree. Moreover, the purification in the separator will be more complete when it is carried out subsequent to the homogenization, at which time the largest particles have been split so that their sludge can be freed from them.

In order to make the homogenization efficient, the milk should be pre-heated to the proper temperature, which is about 50° C. (=122° F.). In addition, in order to obtain a stable emulsion, the milk after the separation should be heated to a comparatively high temperature, for instance 78° C. (=173° F.), which means that it will be pasteurized. Normal pasteurization temperature is about 75° C. (=167° F.), and the milk ought to be heated a little above this temperature. At this high temperature, a destruction takes place of a substance in the milk serum which seems to be necessary for the agglomeration of the fat globules. If such a heating is not undertaken, it so happens that the capacity of the milk to form cream remains after the homogenization and even becomes greater, because the number of fat globules has increased considerably after the homogenization and the agglomerates of these small fat globules occupy a larger volume in the cream layer than the original larger globules.

Figure 2:
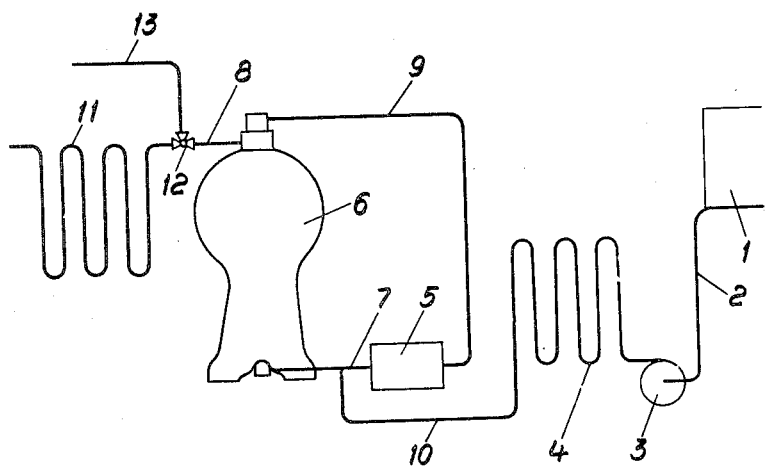

For a better understanding of the invention, reference may be had to the accompanying drawing, in which Fig. 1 is a schematic view of one form of the new installation, and Fig. 2 is a similar view of another form of the installation.

Referring to Fig. 1, the reference numeral 1 indicates a storage tank for the milk which is to be treated. Through the line 2 it is connected with a pump 3, which forces the milk through a pre-heater 4, where it is heated to a temperature which is suitable for homogenization and centrifugal separation, for instance 50° C. (=122° F.). From the pre-heater 4 the milk is passed through a homogenizing locus in a homogenizer 5 (which may be of any conventional form and therefore is not described in detail) and then through the line 7 to a locus of centrifugal force in a centrifugal separator 6.

In the centrifugal separator 6 (which may also be of any conventional form and therefore is not described in detail), the milk is divided into two components, of which one, consisting of homogenized milk with fat particles exclusively below a certain limit size, is discharged as the heavier separated component through the line 8. The larger fat particles, which have passed through the homogenizing machine 5 without having been sufficiently divided up, are contained in the other component (cream component) which leaves the centrifuge through the line 9. The latter line is connected with the line 10 between the pre-heater 4 and the homogenizing machine 5. These larger fat particles, consequently, are returned to the homogenizing machine.

As the homogenizer generally operates with a considerable drop in pressure, the pressure in the line 9 must be considerably higher than the pressure in the line 7. Such a difference in pressure can be obtained with a centrifugal pump or discharge arrangement (paring disc) built in the centrifuge discharge leading to pipe 9. Of course, a separate pump in the line 9 can also be used for raising the pressure there.

The homogenized milk flows through the line 8 to a pasteurizer 11, where it is heated to a temperature, for instance, 78° C. (=173° F.), which destroys the substance or substances in the milk serum which would cause agglomeration of the small fat globules.

The splitting-up of at least the larger fat globules by the homogenizing treatment requires, as previously mentioned, a considerable amount of energy in order to be sure that all the fat globules which leave the homogenizing machine are below a certain limit size. According to the practice heretofore, the homogenizing machine must be operated so that a substantial margin exists between the average value for the size of the fat globules and this limit value. This margin represents a considerable part of the power consumption. According to the present invention, however, the milk after being homogenized is allowed to pass through a centrifugal separator which removes all fat particles above this limit value. Accordingly, the average size of the fat globules leaving the homogenizer may be allowed to come closer to the limit value. A considerable part of the power consumption is thus saved.

In Fig. 2 I have illustrated another form of the installation, in which an additional saving of energy is effected. The installation according to Fig. 2 differs from that of Fig. 1 in that the feed line 10 for the pre-heated milk is connected with the line 7 between the homogenizing machine 5 and the separator 6, so that the feed line by-passes the homogenizer. With this arrangement, only cream from the line 9 will pass through the homogenizing machine. This amounts to only a small fraction of the whole liquid stream. The amount of work required in the homogenizing is a function of the liquid's viscosity and volume. Up to a certain limit for the fat content of the milk, the viscosity increases very little with the fat content, and consequently the homogenizing work will practically be dependent only upon the volume of the liquid and directly proportional to this. Therefore, if 15%, for example, of the total amount of liquid in the line 7 is taken out in the form of cream through the line 9, the homogenizing work in the arrangement according to Fig. 2 will be only about 15% of that which is required in the arrangement according to Fig. 1.

When starting up the installation shown in Fig. 2, practically all the fat globules will go to the line 9 so that the line 8 contains pure skim milk. The reason is that these fat globules have not yet passed through the homogenizing machine 5, and therefore have not been reduced in size sufficiently for accompanying that component which leaves through the line 8. The line 8 should therefore be provided with a three-way cock 12 by means of which the skim milk can be carried off through a branch line 13. When reduced fat particles in sufficient quantity have begun to accompany the milk stream through the separator 6, the cock 12 can be turned so that the homogenized milk flows through the pasteurizer 11.

By virtue of the arrangement shown in Fig. 2, the homogenizing capacity is increased many times because only a small part (about 15%) of the stream of liquid passes through the homogenizing machine. In addition to the very considerable saving of power which it effects, the arrangement thus makes it possible to treat many times larger amounts of milk with a homogenizing machine of given capacity. In order to completely utilize the capacity of this machine, it may be desirable to connect a homogenizing machine with several separators, connected in parallel. Through this arrangement, the cost of the installation will be small in proportion to the quantity of treated milk.

It will be understood that the invention can be used for treatment of other dispersion products than milk. For instance, it can be used when refining vegetable oils by means of alkaline solutions, and mineral oil products with sulphuric acid or other inorganic reagents. In every such case, it is of great advantage that the reactive medium is as homogeneously dispersed as possible in the liquid which is to be treated, partly because a quicker and more complete reaction is obtained, and partly because the quantity of reactive medium can be reduced to a minimum.

In the following claims, therefore, the term "particles" is not limited to fat globules in the product to be treated, and the expression "dispersion product" is intended to include milk and other products having particles in dispersion, as well as emulsions.

I claim:

1. A method of homogenizing milk and other products having particles in dispersion, which comprises the steps of feeding at least part of the dispersion product, containing relatively large dispersed particles, through an homogenizing zone to homogenize the product and effect a reduction in the particle sizes, passing the homogenized product from said zone into a locus of centrifugal force and there separating it into two components, one of which contains relatively small particles, and the other of which contains larger particles, and returning said last component to the homogenizing zone for further homogenization treatment therein to reduce the sizes of said larger particles.

2. A method according to claim 1, in which said steps are carried out continuously, said last component after its return to the homogenizing zone being recycled to the centrifugal locus for further separation.

3. A method according to claim 1, in which the dispersion product is milk, and which comprises also the step of feeding said component having relatively small particles from the centrifugal locus to a pasteurizer.

4. A method according to claim 1, in which the dispersion product is milk, and which comprises also the step of feeding said component having relatively small particles from the centrifugal locus to a pasteurizer and there heating it to a temperature higher than normal pasteurizing temperature for milk.

5. A method according to claim 1, which comprises also the step of heating the dispersion product before feeding the same through the homogenizing zone.

6. A method according to claim 1, in which the homogenized product in said locus is purified simultaneously with said separation.

7. A method of homogenizing milk and other products having particles in dispersion, which comprises feeding a stream of the dispersion product through an homogenizing zone to homogenize the product and effect a reduction in the particle sizes, passing the homogenized product from said zone into a locus of centrifugal force and there separating it into two components, one of which comprises an homogenized product having relatively small particles, and the other of which contains larger particles remaining in the product from the homogenizing zone, and returning said last component to the homogenizing zone for further homogenizing treatment therein along with said stream.

8. A method of homogenizing milk and other products having particles in dispersion, which comprises feeding a stream of the dispersion product into a locus of centrifugal force and there separating it into two components, one of which contains relatively small particles, and the other of which contains larger particles, feeding said last component through an homogenizing zone to homogenize said last component and effect a reduction in the particle sizes, and returning the homogenized component from said zone to said locus for further treatment therein along with said stream.

9. An installation for homogenizing dispersion products, such as milk, which comprises an homogenizing machine, a centrifugal separator, a pipe line for conveying an homogenized product from said machine to the separator, the separator being adapted to separate the homogenized product into two components, one of which contains relatively small particles, and the second of which contains larger particles remaining in the product from said machine, the separator having separate outlets for the respective components, and a recycling connection between the outlet for said second component and the homogenizing machine for returning the second component to said machine for further treatment therein.

10. An installation according to claim 9, comprising also a feed line communicating with the homogenizing machine for delivering a dispersion product thereto simultaneously with the return of said second component.

11. An installation according to claim 9, comprising also a feed line communicating with the separator and by-passing the homogenizing machine, for delivering a dispersion product to the separator simultaneously with the homogenized product from said machine.

12. An installation according to claim 11, comprising also branch discharge lines for said first component, and valve means for selectively connecting said discharge lines to the separator outlet for said first component.

OLOF EINAR FRÖDING.

REFERENCES CITED

The following references are of record in the file of this patent:

UNITED STATES PATENTS

| Number | Name | Date |
| --- | --- | --- |
| Re. 16,576 | Cooney | Mar. 22, 1927 |
| 2,406,819 | Farrall | Sept. 3, 1946 |